US010778890B1

(12) United States Patent
Zinevich et al.

(10) Patent No.: US 10,778,890 B1
(45) Date of Patent: Sep. 15, 2020

(54) VIDEO DENOISING SYSTEMS AND METHODS

(71) Applicant: AMAZON TECHNOLOGIES, INC., Seattle, WA (US)

(72) Inventors: Artem Zinevich, Seattle, WA (US); John Bremsteller, Seattle, WA (US); Takanori Miki, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/588,051

(22) Filed: Sep. 30, 2019

(51) Int. Cl.
*H04N 5/217* (2011.01)
*H04N 5/232* (2006.01)
*H04N 7/18* (2006.01)
*H04N 19/80* (2014.01)
*H04N 19/124* (2014.01)
*H04N 19/13* (2014.01)

(52) U.S. Cl.
CPC ......... *H04N 5/23229* (2013.01); *H04N 7/186* (2013.01); *H04N 19/124* (2014.11); *H04N 19/13* (2014.11); *H04N 19/80* (2014.11)

(58) Field of Classification Search
CPC .. H04N 5/23229; H04N 19/124; H04N 7/186; H04N 19/13; H04N 19/80
See application file for complete search history.

(56) References Cited

U.S. PATENT DOCUMENTS

| 8,223,225 | B2 | 7/2012 | Jang et al. | |
|---|---|---|---|---|
| 8,514,302 | B2* | 8/2013 | Utsugi | H04N 5/217 348/241 |
| 8,855,198 | B2* | 10/2014 | Kimoto | H04N 19/61 375/240.11 |
| 2010/0026856 | A1* | 2/2010 | Jang | H04N 5/357 348/241 |
| 2015/0117537 | A1* | 4/2015 | Luo | H04N 19/615 375/240.16 |

* cited by examiner

*Primary Examiner* — Howard D Brown, Jr.
(74) *Attorney, Agent, or Firm* — Lathrop GPM LLP (57) ABSTRACT

A method for denoising a video signal includes (i) generating a first low-frequency frame, including one or more first low-spatial-frequency components of a first video frame of the video, by filtering one or more first high-spatial-frequency components from the first video frame; and (ii) generating a first filtered frame by recursively filtering the first low-frequency frame. The method also includes (iii) generating a second low-frequency frame from a second video frame of the video subsequent to the first video frame, by filtering one or more second high-spatial-frequency components from the second video frame; (iv) generating a high-frequency frame from the second video frame and the second low-frequency frame; (v) recursively filtering the second low-frequency frame with the first filtered frame to yield a denoised low-frequency frame; and (vi) generating a denoised video frame by combining the denoised low-frequency frame with the high-frequency frame.

20 Claims, 6 Drawing Sheets

┌─────────────────────────────────────────────────────────────────────────┐
│ 310  Chroma subsample a first and second video frame from a first color space to a luminance- │
│      chrominance color space.                                            │
└─────────────────────────────────────────────────────────────────────────┘
                                        ↓
┌──────────────────────────────────────────────────┐  ┌──────────────┐
│ 320  Generate a first low-frequency frame by filtering one or more │  │ method 400   │
│      high-frequency components from the first video frame.         │  └──────────────┘
└──────────────────────────────────────────────────┘
                                        ↓
┌─────────────────────────────────────────────────────────────────────────┐
│ 330  Generate a first filtered frame by recursively-filtering the first low-frequency frame. │
│ ┌─────────────────────────────────────────────────────────────────────┐ │
│ │ 334  Recursively-filter the first low-frequency frame to yield a first intermediate frame. │ │
│ │ ┌─────────────────────────────────────────────────────────────────┐ │ │
│ │ │ 335  Apply a recursive filter to the first low-frequency frame generated in step 330. │ │ │
│ │ └─────────────────────────────────────────────────────────────────┘ │ │
│ └─────────────────────────────────────────────────────────────────────┘ │
│                                        ↓                                 │
│ ┌─────────────────────────────────────────────────────────────────────┐ │
│ │ 336  Compress the first intermediate frame to yield a first compressed frame. │ │
│ └─────────────────────────────────────────────────────────────────────┘ │
│                                        ↓                                 │
│ ┌─────────────────────────────────────────────────────────────────────┐ │
│ │ 338  Decompress the first compressed frame to yield the first filtered frame. │ │
│ └─────────────────────────────────────────────────────────────────────┘ │
└─────────────────────────────────────────────────────────────────────────┘
                                        ↓
┌─────────────────────────────────────────────────────────────────────────┐
│ 340  Generate a second low-frequency frame, including one or more second low-frequency │
│      components, by filtering high-frequency components from the second video frame. │
└─────────────────────────────────────────────────────────────────────────┘
                                        ↓
┌─────────────────────────────────────────────────────────────────────────┐
│ 350  Generate a high-frequency frame from the second video frame.       │
│ ┌─────────────────────────────────────────────────────────────────────┐ │
│ │ 352  Apply the image-compression technique of step 336 to the second low-frequency frame to yield │ │
│ │      a second intermediate frame.                                   │ │
│ └─────────────────────────────────────────────────────────────────────┘ │
│                                        ↓                                 │
│ ┌─────────────────────────────────────────────────────────────────────┐ │
│ │ 354  Apply the image-decompression technique of step 338 to the second intermediate frame to yield │ │
│ │      a subtrahend frame.                                            │ │
│ └─────────────────────────────────────────────────────────────────────┘ │
│                                        ↓                                 │
│ ┌─────────────────────────────────────────────────────────────────────┐ │
│ │ 356  Subtract the subtrahend frame from the second video frame      │ │
│ └─────────────────────────────────────────────────────────────────────┘ │
└─────────────────────────────────────────────────────────────────────────┘
                                        ↓
┌─────────────────────────────────────────────────────────────────────────┐
│ 360  Recursively-filter the second low-frequency frame with the first filtered frame to yield a denoised │
│      low-frequency frame.                                               │
└─────────────────────────────────────────────────────────────────────────┘
                                        ↓
┌─────────────────────────────────────────────────────────────────────────┐
│ 370  Generate a denoised video frame by combining the denoised low-frequency frame with the high- │
│      frequency frame.                                                   │
└─────────────────────────────────────────────────────────────────────────┘

VIDEO DENOISING SYSTEMS AND METHODS

TECHNICAL FIELD

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to efficiently transmit quality video.

BACKGROUND

Image noise is random variation of brightness or color information in images, and may be caused by electronic noise (unwanted disturbance in an electrical signal) and/or low-light conditions in the field of view of a camera, among other possible causes. Noise is an undesirable by-product of image capture that obscures the desired information. Video captured by an image sensor, particularly video captured in low-light conditions, typically includes noise that degrades video quality. Video is typically compressed prior to being transmitted, such as when video is uploaded from a security camera to the cloud for storage or for further transmission to a client device (e.g., a smartphone). Compressing noisy video increases video-compression error-rates which degrades video quality and/or increases the bandwidth required to transmit the noisy video.

DETAILED DESCRIPTION OF THE EMBODIMENTS

Noise in videos causes an unpleasant user experience, and is typically reduced in camera image processors. Noise includes read noise, shot noise, and fixed-pattern noise. Read noise and shot noise are random, and therefore incompressible by a video encoder, which causes more video quality degradation while transmitting. An effective way to reduce noise in video is to apply temporal noise reduction, that is, to time-average the video signal while accounting for motion in a scene. Embodiments herein apply temporal noise reduction via an infinite impulse-response (IIR) filter, in which for each frame, a copy of the last output video frame is written to, stored in, and read out from memory.

For typical 1080p (full-HD) 8-bit video in YUV420 format, one frame of video is 3 MB of data. It may be a small problem for a large system-on-chip that uses large DRAM memory modules, but for a small system-on-chip, 3 MB of memory may cause a significant increase in die cost. Moreover, DRAM access may be very expensive bandwidth-wise and energy-wise. This is why many lower-cost system-on-chips do not use temporal filtering, which results in noisy video. Noise removal is more effective when on-chip memory is used for temporal filtering of both luminance (brightness) components and chrominance (color) components.

One aspect of the present embodiments includes the realization that it is large-spatial-scale noise ("low-spatial-frequency noise") that is most objectionable for users. Furthermore, the small-spatial-scale noise ("high-spatial-frequency noise" or "grain") may be even not visible starting from certain viewing distance, or on a small mobile display, or may just be suppressed by a video encoder's quantization. The present embodiments solve the problem of objectionable noise by temporally filtering low-spatial-frequency components of video frames, which requires less system-on-chip memory than does temporally filtering both low- and high-spatial-frequency components. The filtering removes read noise and shot noise. This denoised video can be efficiently and accurately compressed for transmission.

Figure 1:
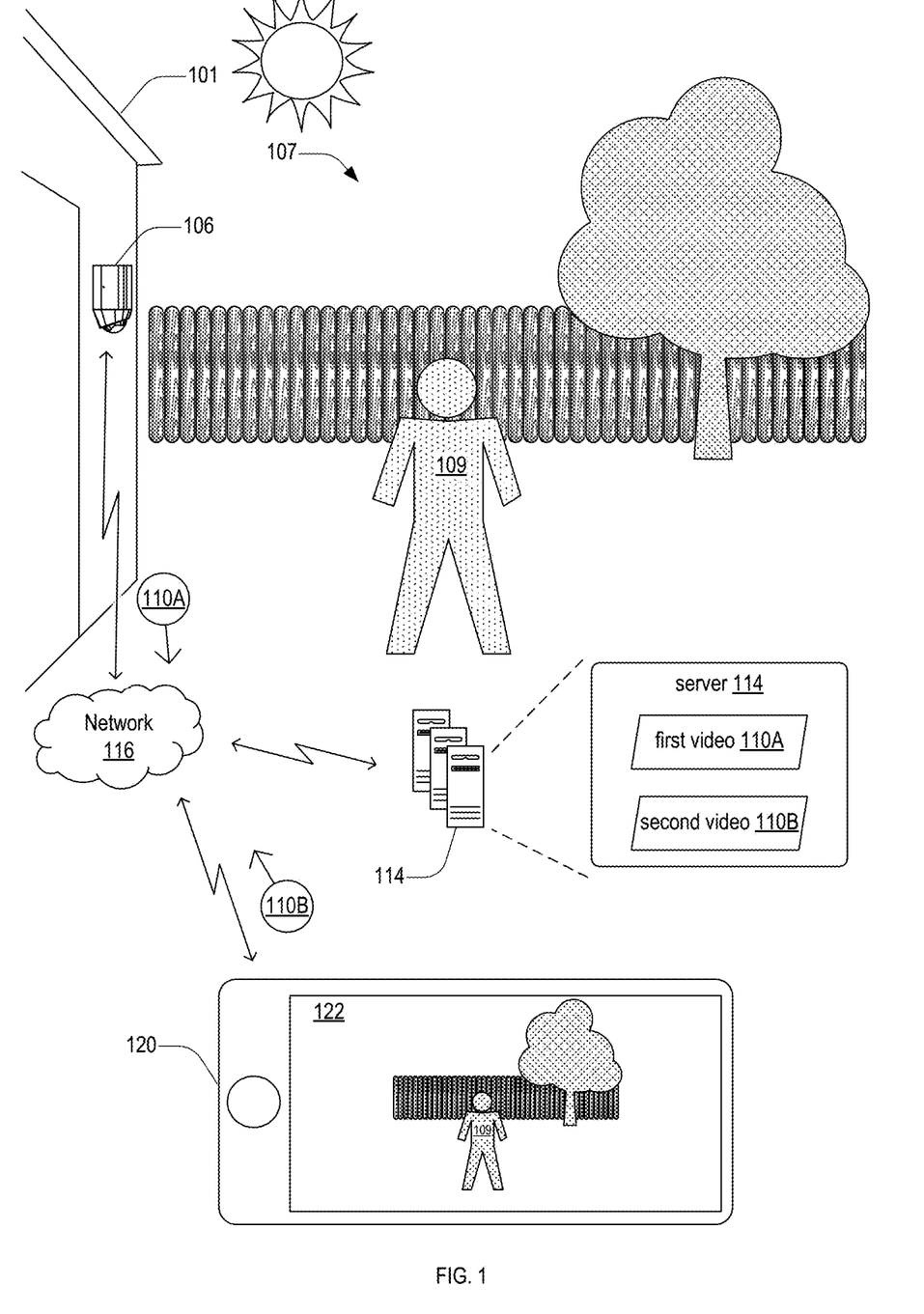
FIG. 1 is a schematic diagram of a video communication device communicatively coupled to a client device via a backend server, in an embodiment.

FIG. 1 is a schematic diagram of a video communication device 106 communicatively coupled a client device (e.g., a smartphone) 120 via a server 114. The video communication device 106 may also be referred to as a security device 106. The server 114 is configured to receive, via a network 116, a first video 110A from a camera of the video communication device 106, and a second video 110B from the client device 120. For example, when one or more sensors of the video communication device 106 detects an event within a monitored environment 107, the video communication device 106 may capture and transmit the first video 110A (including live video and audio) of the monitored environment 107 to the server 114. In embodiments, the server 114 is a network-connected device, and may include at least one of a home automation hub and a premises security hub.

In the example of FIG. 1, the video communication device 106 is positioned on a structure (e.g., a house) 101 to interact with the monitored environment 107 using one or more sensors (e.g., a camera, a passive infrared (PIR) sensor, a temperature sensor, a microphone, etc.) and/or one or more actuators (e.g., a speaker and/or a light). The client device 120 may be configured to also receive and display the first video 110A on a display 122. The client device 120 may be a smart display or a mobile device, such as a smartphone, a tablet computer, or a notebook computer. Without departing from the scope of embodiments herein, the video communication device 106 may also be a smart display or a mobile device, and may not be positioned in a location that is neither on or within the structure 101.

A user of the client device 120 may view and interact with the first video 110A, and thereby view and/or interact with the monitored environment 107. For example, as shown in FIG. 1, the video communication device 106 may detect the presence of a visitor 109 within the monitored environment 107, capture and send the first video 110A to the server 114 and/or to the client device 120, and allow the user of the client device 120 to interact with the visitor 109. In various embodiments, the video communication device 106 may send the first video 110A directly to the client device 120, or may send the first video 110A to the server 114, and the server 114 may further send the first video 110A to the client device 120. The video communication device 106 may include a display (not shown) configured to display the second video 110B generated by the client device 120.

Figure 2:
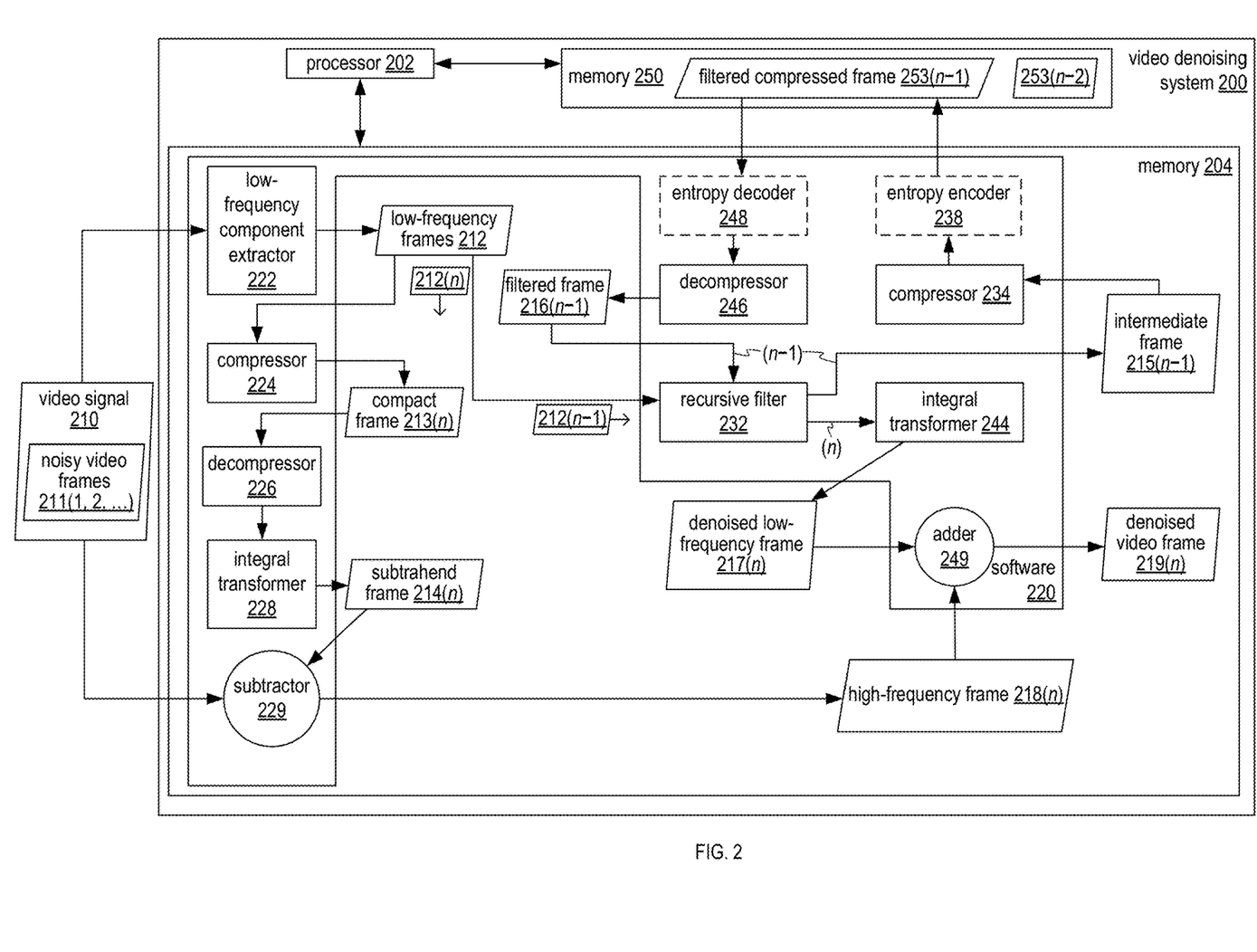
FIG. 2 is a schematic pixel-block diagram of a video denoising system implementable in the video communication device of FIG. 1, in an embodiment.

FIG. 2 is a schematic block diagram of a video denoising system 200 for generating a denoised video frame 219($n$) by processing consecutive noisy video frames 211($n$−1) and 211($n$) of a video signal 210. Each of the first and second videos 110A and 110B (FIG. 1) is an example of the video signal 210. In embodiments, the video denoising system 200 is implemented in one or more of the video communication device 106, the server 114, and the client device 120.

The video denoising system 200 includes a processor 202 communicatively coupled to a memory 204, and a memory 250. The memory 204 includes software 220 that, in processes disclosed herein for a generating the denoised video frame 219($n$), produces low-frequency frames 212($n$) and 212($n$−1), a compact frame 213($n$), a subtrahend frame 214($n$), an intermediate frame 215($n$−1), a filtered frame 216($n$−1), a denoised low-frequency frame 217($n$), and a high-frequency frame 218($n$). Any frame referred to herein that is stored by the memory 204 or 250 is a video frame even if not preceded by "video."

In embodiments, each of the frames 211-219 is a respective image captured by video communication device 106, e.g., by an image sensor thereof. The image sensor may include a color-filter array with color filters each transmitting a spectral band of light corresponding to a color of an additive color model (e.g., red, green, blue), a subtractive color model (e.g., cyan, magenta, yellow). The color-filter array may include a plurality of color filters configured in a Bayer array. One or both of the memory 204, 250 may store each of the frames 211-219 in either an image file format, such as PEG and TIFF, or a raw image format, such as TIFF/EP and Digital Negative (DNG). The video signal 210 may be either inter-frame coded or intra-frame coded. The processor 202 may include any processor, such as a central processing unit (CPU), an image signal processor (ISP), a microprocessor, an application-specific integrated circuit (ASIC), an ARM processor (a processor based on the RISC (reduced instruction set computer) architecture developed by Advanced RISC Machines (ARM)), a controller, a microcontroller, etc. In certain embodiments, the processor 202 may include multiple processors, and may include one or more other processors, such as one or more microprocessors, and/or one or more supplementary co-processors, such as math co-processors.

Each of the memory 204 and 250 may be transitory and/or non-transitory, and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of the memory 204 and/or 250 may be integrated into the processor 202. In embodiments, the memory 204 is non-volatile memory and the memory 250 is volatile memory. The memory 250 may be part of the memory 204.

The video signal 210 includes a plurality of noisy video frames 211, which includes the aforementioned noisy video frames 211($n$−1) and 211($n$), where n is a positive integer and the noisy video frame 211($n$−1) temporally precedes the noisy video frame 211($n$). In embodiments, the video signal 210 (e.g., video frames 211 thereof) is represented, e.g., encoded, in a luminance-chrominance color space, such as YUV and CIELAB, and/or a decorrelated color space. Candidate YUV color spaces include YUV 420 and YUV 422. In embodiments, the video signal 210 may be represented in an additive color model, such as RGB. In embodiments, the memory 204 or the memory 250 stores at least one of the video frames 212-219. For example, the memory 204 or the memory 250 may simultaneously store at least one of the frames 212($n$−1), 213($n$), 214($n$), 215($n$−1), 216($n$−1), 217($n$), 218($n$), and 219($n$).

The software 220 receives the noisy video frames 211($n$−1) and 211($n$). The software 220 implements a low-frequency component extractor 222 and a subtractor 229 (described below) as computer readable instructions that, when executed by the processor 202, control the processor 202 to implement the following functionality. The low-frequency component extractor 222 generates the low-frequency frame 212($n$−1) and the low-frequency frame 212($n$) from the noisy frames 211($n$−1) and 211($n$), respectively. In embodiments, the low-frequency component extractor 222 implements a discrete cosine transform (DCT). A discrete transform expresses a finite sequence of data points in terms of a sum of cosine functions oscillating at different frequencies. Candidate pixel-block sizes for the DCT include four-by-four and eight-by-eight. In embodiments, the low-frequency component extractor 222 extracts spatial frequency coefficients corresponding to the lowest M spatial frequencies, where integer M≥1. For example, M≥2 such that the extracted spatial frequency coefficients include one or more coefficients corresponding to a non-DC (non-zero) spatial frequency.

The software 220, in embodiments, also includes at least one of a compressor 224 and a decompressor 226 as computer readable instructions that, when executed by the processor 202, control the processor 202 to implement the following functionality. The compressor 224 compresses the low-frequency frame 212($n$) to produce the compact frame 213($n$), which the decompressor 226 decompresses to produce the subtrahend frame 214($n$), which the subtractor 229 receives as an input. In embodiments, the compressor 224 implements a lossy compression technique such as quantization. In embodiments, the lossy compression technique includes one or more of exact-match integer 4×4 spatial block transform, a secondary Hadamard transform (for DC coefficients), and logarithmic-step quantization. The decompressor 226 may implement an inverse of the lossy compression technique implemented by the compressor 224. When the video denoising system 200 does not implement the compressor 224 and the decompressor 226, the subtrahend frame 214($n$) is identical to the low-frequency frame 212($n$), for example, either a spatial-domain representation or a frequency-domain representation of the low-frequency frame 212($n$).

The software 220 may include an integral transformer 228 as computer readable instructions that, when executed by the processor 202, control the processor 202 to transform the output of the low-frequency component extractor 222 (or the decompressor 226) from the frequency domain to a spatial domain, such that the subtractor 229 receives the subtrahend frame 214($n$) as a spatial-domain video frame, which facilitates its subtraction from the noisy frame 211($n$) when the noisy frame 211($n$) is also a spatial-domain video frame. In embodiments, the integral transformer 228 implements an inverse Fourier transform.

In embodiments, the subtractor 229 receives two inputs—the noisy video frame 211($n$) and the subtrahend frame 214($n$)—and generates the high-frequency frame 218($n$) by subtracting the subtrahend frame 214($n$) from the noisy video frame 211(*n*). In embodiments, the video frames 211 and 214 have the same bit depth. In embodiments, the noisy video frame 211(*n*) and the subtrahend frame 214(*n*) are respective array data structures (two-dimensional, for example), and the subtractor 229 executes an element-wise (obtained by operating on one element (of a matrix etc.) at a time) subtraction of the subtrahend frame 214(*n*) from the noisy video frame 211(*n*)

The software 220 further includes a recursive filter 232, a compressor 234, a decompressor 246, and, in embodiments, an entropy encoder 238 and an entropy decoder 248 as computer readable instructions that, when executed by the processor 202, control the processor 202 to implement the following functionality. The compressor 234 receives the low-frequency frame 212(*n*), which is the same frame that the compressor 224 receives. In embodiments, the compressor 234 implements a lossy compression technique such as quantization. The decompressor 246 may implement an inverse of the lossy compression technique implemented by the compressor 234.

When the software 220 includes the compressor 224, both the compressor 224 and the recursive filter 232 receive the low-frequency frame 212(*n*). In embodiments that include the compressor 224 and the decompressor 226, the compressor 224 and the decompressor 226 may implement the same compression/decompression techniques as the compressor 234 and the decompressor 246, respectively. Such matching compression/decompression techniques results in the denoised low-frequency frame 217 and the high-frequency frame 218 being similarly processed before being combined as the denoised frame 219, such that difference in processing is isolated to the recursive filter 232, which produces the denoised low-frequency frame 217.

The recursive filter 232 applies a recursive filter, such as an infinite impulse-response filter, to the low-frequency frame 212(*n*−1) to yield the intermediate frame 215(*n*−1). When generating the intermediate frame 215(*n*−1), an input to the recursive filter 232 is a filtered frame 216(*n*−2) generated by the video denoising system 200 during a previous iteration that resulted in the denoised video fame 219(*n*−1). During at least part of this previous iteration, the memory 250 stores a filtered compressed frame 253(*n*−2).

The compressor 234 compresses the intermediate frame 215(*n*−1) to generate a filtered compressed frame 253(*n*−1), which is stored in the memory 250. The decompressor 246 generates the filtered frame 216(*n*−1) from the filtered compressed frame 253(*n*−1).

When the software 220 includes the entropy encoder 238 and the entropy decoder 248, the filtered compressed frame 253(*n*−1) may be entropy-encoded by the entropy encoder 238 before being stored in the memory 250, and the filtered compressed frame 253(*n*−1) may be entropy-decoded by the entropy decoder 248 before being decompressed by the decompressor 246. In embodiments, the encoder 238 and the decoder 248 are inactive or not included. In further embodiments, the compressor 234, the encoder 238, the decoder 248, and the decompressor 246 are inactive or not included, and the intermediate frame 215(*n*−1) equals the filtered frame 216(*n*−1).

The recursive filter 232 recursively filters the low-frequency frame 212(*n*) with the filtered frame 216(*n*−1) to yield a denoised low-frequency frame 217(*n*). The denoised low-frequency frame 217(*n*) and the high-frequency frame 218(*n*) are inputs to the adder 249, which outputs the denoised video frame 219(*n*), which is the sum of the frames 217(*n*) and 218(*n*). In embodiments, the denoised low-frequency frame 217(*n*) and the high-frequency frame 218(*n*) are two-dimensional, for example, and the adder 249 executes an element-wise addition of the denoised low-frequency frame 217(*n*) and the high-frequency frame 218(*n*).

In embodiments, the frames 217 and 218 have the same bit depth. In embodiments, each of the frames 214, 217, 218, and 219 have a same bit depth equal to that of the noisy video frame 211. In embodiments, the bit depth and color-space encoding of each of the frames 214, 217, 218, and 219 match that of the noisy video frame 211.

In embodiments, the recursive filter 232 applies an infinite impulse-response filter to the low-frequency frame 212(*n*) with the filtered frame 216(*n*−1) to yield the denoised low-frequency frame 217(*n*). Expressing this filtering as a linear system, frames 212(*n*), 216(*n*−1), and 217(*n*) are represented by frequency-domain frames $F_n(v_x,v_y)$, $G_{n-1}(v_x,v_y)$, and $G_n(v_x,v_y)$, respectively, where $G_n(v_x,v_y) = K \cdot F_n(v_x,v_y) + (1-K) \cdot G_{n-1}(v_x,v_y)$, and $|K| < 1$ is a loop coefficient.

The software 220 may include an integral transformer 244, as computer readable instructions that, when executed by the processor 202, control the processor 202 to transform the output of the recursive filter 232 (for frame n in FIG. 2) from the frequency domain to a spatial domain, such that the adder 249 receives the denoised low-frequency frame 217(*n*) as a spatial-domain video frame. In embodiments, the integral transformer 244 is similar in structure and/or function to the integral transformer 228 described above.

In an embodiment, the video signal 210 is a YUV 420 signal with bit-depth of 8, and the low-frequency component extractor 222 implements a DCT with a four-by-four pixel-block size. The following description applies to this embodiment. A pixel-block of one noisy video frame 211 occupies 192 bits. For each pixel-block, the low-frequency component extractor 222 selects three (M=3) eight-bit spatial frequency coefficients for each of the Y, U, and V channels, such that each pixel-block of one low-frequency frame 212 occupies 3×8×3=72 bits. The spatial frequencies corresponding to the three spatial frequency coefficients are: a zero-spatial frequency coefficient ($c_{00}$), the lowest non-zero spatial frequency coefficient ($c_{10}$) in a first direction (e.g., horizontal), and the lowest non-zero spatial frequency coefficient ($c_{01}$) in a second direction orthogonal to the first direction (e.g., vertical).

In this embodiment, the compressors 224 and 234 output four-by-four pixel-blocks where the bit depth of the three spatial frequencies coefficients are six, four, and four for luminance value Y, chrominance channel U, and chrominance channel V, respectively. Accordingly, each pixel-block occupies 3×(6+4+4)=42 bits. In this embodiment, the decompressors 226 and 246 output four-by-four pixel-blocks where the bit depth of the three spatial frequencies coefficients is eight for each channel Y, U, and V. Accordingly, each pixel-block occupies 3×(8+8+8)=72 bits.

In this embodiment, the integral transformers 228 and 244 output spatial-domain images in which each four-by-four pixel-block occupies the same amount of memory as one noisy video frame 211. For example, each four-by-four pixel of the frames 214(*n*) and 217(*n*) occupies 192 bits: sixteen eight-bit luminance (Y) values, four eight-bit chrominance (U) values, and four eight-bit chrominance (V) values. In this example, each two-by-two pixel sub-array of a four-by-four pixel is assigned a single chrominance value U and single chrominance value V each equal to a respective average of the chrominance values over the two-by-two pixel sub-array.

The above description of the video denoising system 200 illustrates how embodiments presented herein address the problem of denoising video signals in a way that is both computationally efficient and space efficient. Since human vision is more sensitive to low-spatial-frequency noise, embodiments of the video denoising system 200 remove high-spatial-frequency components from video frames before applying denoising processes.

In the above example, where the low-frequency component extractor 222 extracts spatial frequency coefficients corresponding to the lowest M=3 spatial frequencies, the capacity requirements of memory 250 are significantly reduced (by a factor of 192/42 in this example), which enables on-chip frame filtering that is computationally efficient and, by reducing die area required by the memory 250, space-efficient on a system-on-chip. Increasing M would result in greater denoising at the expense of increased capacity requirements for the memory 250 and associated on-chip area to accommodate the memory 250. Conversely, decreasing M would remove less noise while alleviating memory and on-chip space requirements. Further reduction in memory (or improvement of quality) may be achieved by tuning the transform size and quantization table.

Embodiments may use a DCT for a complete spectral decomposition of the signals. For example, for a 4×4 DCT block, all sixteen coefficients may be calculated. In embodiments, the video denoising system 200 performs additional processing on these coefficients. For example, [1] low-frequency coefficients may be temporally de-noised, [2] medium-frequency/edge-related coefficients may be be enhanced in parallel to the temporal denoising, and [3] the very high frequency coefficients, likely related to the noise, can be reduced.

In embodiments, the denoised video frame 219 has a distinct signal-to-noise feature when represented in a pyramid representation known in the art of image processing. A pyramid representation includes a plurality of images $I_m$ each having been filtered (e.g. convolved) with a blur or low-pass filter e.g., a box-car filter, and sub-sampled, a quantity m times, where m is known as a level of the pyramid.

For independent, identically distributed (IID) random noise (white noise), applying such spatial filters will cause noise standard deviation reduction of 3 dB SNR change for each level of the pyramid. This is a typical SNR (or temporal SNR) profile that could be measured if no processing is applied. A metric $SNR_2-SNR_0$ would produce close to 6 dB outcome. In practice, noise suppression applied in typical temporal filters will suppress the noise in all frequency bands equivalently, so the metric $SNR_2-SNR_0$ would be expected to stay at least at 6 dB. Low-end image processors will typically suppress high-frequency noise stronger than low-frequency, such that in this case the metric $SNR_2-SNR_0$ will be less than 6 dB. Since high-spatial frequencies of the denoised video frame 219 are not suppressed, the metric $SNR_2-SNR_0$ will exceed 6 dB.

Figure 3:
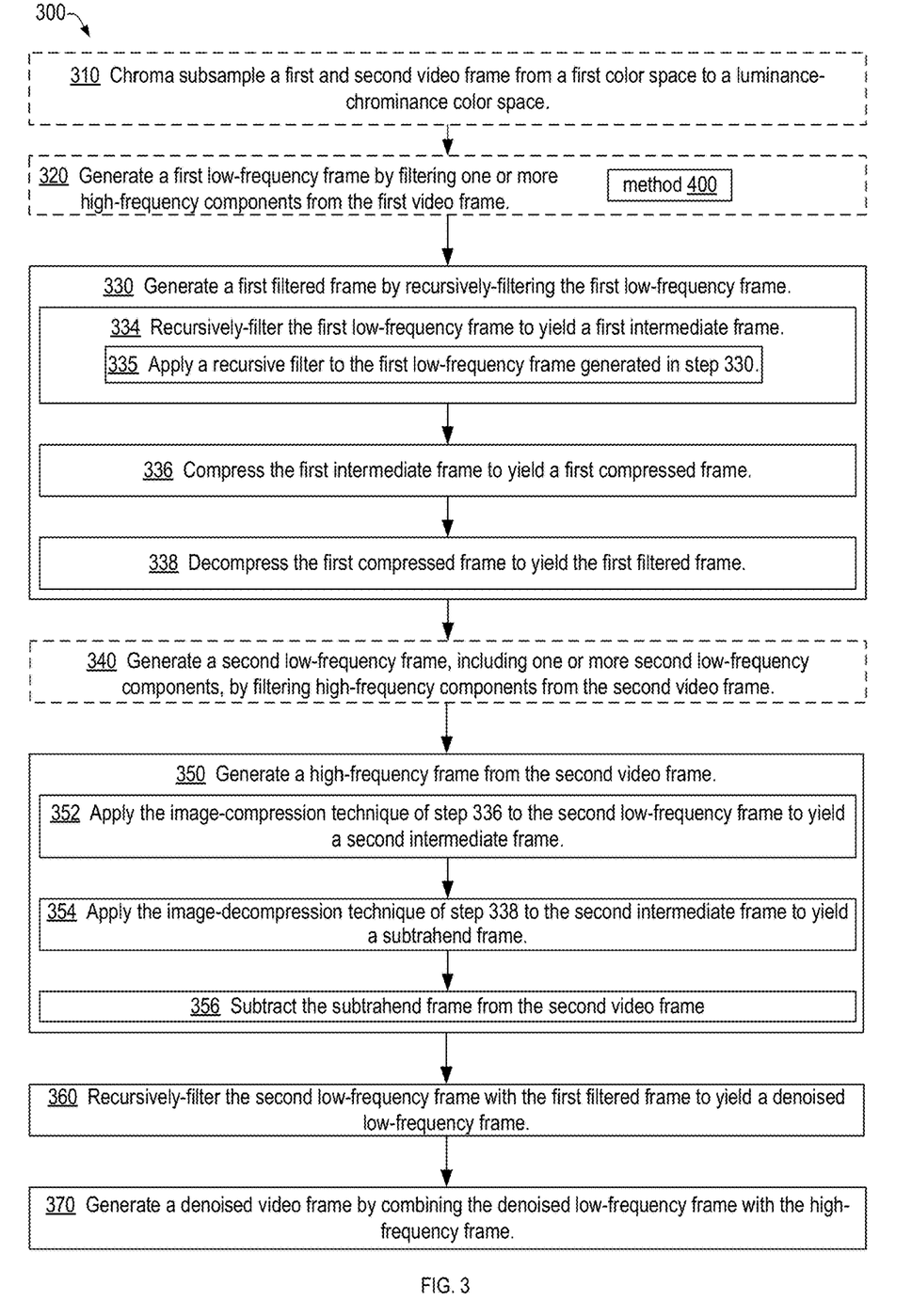
FIG. 3 is a flowchart illustrating a method for denoising a video signal of FIG. 1, in an embodiment.

FIG. 3 is a flowchart illustrating a method 300 for denoising a video signal according to various aspects of the present embodiments. The method 300 may be implemented within one or more aspects of the video denoising system 200. In embodiments, the method 300 is implemented by the processor 202 executing computer-readable instructions of the software 220. The method 300 includes blocks 330, 350, 360, and 370. In embodiments, the method 300 also includes at least one of blocks 310, 320, and 340.

Block 310 includes chroma subsampling a first video frame of a video signal from a first color space to a luminance-chrominance color space. The first color space may be based on one of an additive color model and a subtractive color model. Block 310 also includes chroma subsampling a second video frame from the first color space to the luminance-chrominance color space. In an example of block 310, the software 220 chroma subsamples consecutive video frames of a video signal encoded with either an additive or a subtractive color model to generate the noisy video frames 211($n$−2), 211($n$−1), and 211($n$).

Block 320 includes generating a first low-frequency frame, including one or more first low-frequency components of a first video frame of the video, by filtering one or more first high-frequency components from the first video frame. In an example of block 320, the low-frequency component extractor 222 generates the low-frequency frame 212($n$−1) from the noisy video frame 211($n$−1).

Block 330 includes generating a first filtered frame by recursively-filtering the first low-frequency frame. In an example of block 330, the recursive filter 232 recursively-filters the low-frequency frame 212($n$−1) with the filtered frame 216($n$−2) to generate the intermediate frame 215($n$−1), which, in embodiments, equals the filtered frame 216($n$−1). In embodiments, the recursive filter 232 is an infinite impulse-response filter, which the video denoising system 200 executes to implement the recursive-filtering of block 330 and/or block 360.

In embodiments, block 330 includes blocks 334, 336, and 338. Block 334 includes recursively-filtering the first low-frequency frame to yield a first intermediate frame. In one example of block 334, the recursive filter 232 filters the low-frequency frame 212($n$−1) to yield the intermediate frame 215($n$−1).

Block 334 may include block 335, which includes applying a recursive filter to the first low-frequency frame. Inputs to the recursive filter may include one or more decompressed, e.g., dequantized, low-frequency coefficients corresponding to a previous video frame of the video signal that precedes the first video frame. In an example of block 335, the recursive filter 232 filters the low-frequency frame 212($n$−1) with the filtered compressed frame 253($n$−2).

Block 336 includes compressing the first intermediate frame to yield a first compressed frame. In an example of block 336, the compressor 234 compresses the intermediate frame 215($n$−1) to yield the filtered compressed frame 253($n$−1). Compressing the intermediate frame 215($n$−1) may also include entropy encoding the frame, e.g., by the entropy encoder 238.

Block 338 includes decompressing the first compressed frame to yield the first filtered frame. In an example of block 338, the decompressor 246 decompresses the filtered compressed frame 253($n$−1) to yield the filtered frame 216($n$−1). When the filtered compressed frame 253($n$−1) is entropy encoded, decompressing the filtered compressed frame 253($n$−1) may also include entropy decoding the frame, e.g., by the entropy decoder 248.

Block 340 includes generating a second low-frequency frame, including one or more second low-frequency components of a second video frame of the video signal subsequent to the first video frame, by filtering one or more second high-frequency components from the second video frame. In an example of block 340, the low-frequency component extractor 222 generates the low-frequency frame 212($n$) from the noisy video frame 211($n$).

In embodiments of the method 300, either the compressor 224 and the decompressor 226 do not act on the low-frequency frame 212($n$), or the video denoising system 200 includes neither the compressor 224 nor the decompressor 226. In such embodiments, the subtrahend frame 214($n$) is equal to the low-frequency frame 212($n$), for example, either a spatial-domain representation or a frequency-domain representation of the low-frequency frame 212(n). Also in such embodiments, the high-frequency frame 218 may be generated directly from the low-frequency component extractor 222, which operates to separate the noisy video frame 211(n) into the low-frequency frame 212(n) and the high-frequency frame 218(n).

Block 350 includes generating a high-frequency frame from the second video frame. In a first example of block 350, the low-frequency component extractor 222 generates the high-frequency frame 218(n) by separating the video frame 211(n) into the low-frequency frame 212(n) and the high-frequency frame 218(n).

Block 350 may include generating the high-frequency frame from both the second video frame and the second low-frequency frame. For example, block 350 may include block 356, in which generating the high-frequency frame includes subtracting the second low-frequency frame from the second video frame. In an example of block 356, the low-frequency frame 212(n) and the subtrahend frame 214(n) are identical, and the subtractor 229 generates the high-frequency frame 218(n) by subtracting the subtrahend frame 214(n) from the noisy video frame 211(n).

Block 352 includes applying an image-compression technique to the second low-frequency frame to yield a compact frame. In an example of block 352, the compressor 224 applies an image-compression technique to the low-frequency frame 212(n) to yield the compact frame 213(n). In embodiments, the compression technique applied in block 352 is the same as the compression technique applied in block 336.

Block 354 includes applying an image-decompression technique to the compact frame to yield a subtrahend frame. In an example of block 354, the decompressor 226 applies an image-decompression technique to the compact frame 213(n) which yields the subtrahend frame 214(n) in either a spatial-domain representation or a frequency-domain representation. In embodiments, the decompression technique applied in block 354 is the same as the decompression technique applied in block 338.

Block 360 includes recursively-filtering the second low-frequency frame with the first filtered frame to yield a denoised low-frequency frame. In an example of block 360, the recursive filter 232 recursively filters the low-frequency frame 212(n) with the filtered frame 216(n−1) to yield the denoised low-frequency frame 217(n). When the recursive filter 232 outputs a frequency-domain frame, block 360 may include applying an integral transform to the frequency-domain frame such that the denoised low-frequency frame is a spatial-domain frame. For example, the integral transformer 244 applies an integral transform to the output of the recursive filter 232 such that the denoised low-frequency frame 217(n) is a spatial-domain frame.

Block 370 includes generating a denoised video frame by combining the denoised low-frequency frame with the high-frequency frame. In an example of block 370, the adder 249 generates the denoised video frame 219(n) as a sum of the denoised low-frequency frame 217(n) and the high-frequency frame 218(n).

Figure 4:
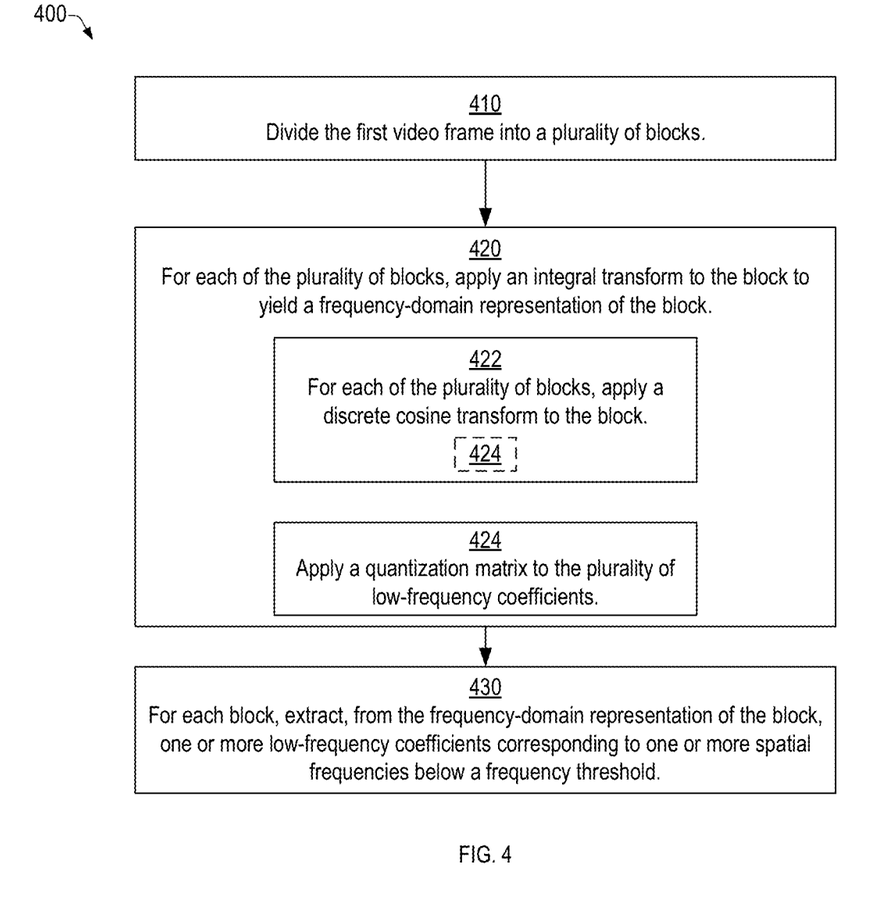
FIG. 4 is a flowchart illustrating a method for generating a low-frequency frame of the method of FIG. 3, in an embodiment.

In embodiments, block 320 includes a method 400 for generating the low-frequency frame. FIG. 4 is a flowchart illustrating the method 400 according to various aspects of the present embodiments. The method 400 includes blocks 410, 420, and 430. Block 410 includes dividing the first video frame into a plurality of pixel-blocks. In an example of block 410, the low-frequency component extractor 222 divides the noisy video frame 211(n−1) into a plurality of four-by-four pixel-blocks.

Blocks 420 and 430 apply to each pixel-block of the plurality of pixel-blocks created at block 410. Block 420 includes applying an integral transform to the pixel-block to yield a frequency-domain representation of the pixel-block. In an example of block 420, the low-frequency component extractor 222 applies an integral transform to a first one of the plurality of four-by-four pixel-blocks of the noisy video frame 211(n−1).

Block 420 may include block 422, which includes, for each pixel-block of the plurality of pixel-blocks, applying a discrete cosine transform to the pixel-block. In an example of block 422, the low-frequency component extractor 222 applies a discrete cosine transform to a first one of the plurality of four-by-four pixel-blocks of the noisy video frame 211(n−1).

When block 420 includes block 422 and the one or more low-frequency coefficients includes a plurality of low-frequency coefficients, block 420 may also include block 424. Block 424 includes applying a quantization matrix to the plurality of low-frequency coefficients. Block 424 may be part of block 422. In an example of block 424, the plurality of low-frequency coefficients are part of a matrix stored as an array data type, the low-frequency component extractor 222 multiplies this matrix by a quantization matrix.

Block 430 includes extracting, from the frequency-domain representation of the pixel-block, one or more low-frequency coefficients corresponding to frequencies below a frequency threshold. The frequency threshold may be the aforementioned ordinal threshold M denoting the lowest M spatial frequencies. Alternatively, the frequency threshold may be a specific frequency value with uses of cycles per pixel or line-pairs per pixel. The frequency value may range from 0.03125 cycles per pixel to 0.25 cycles per pixel, and depends on pixel size, image resolution, and expected viewing distance. In an example of block 430, the low-frequency component extractor 222 extracts, from the frequency-domain representation of the first one of the plurality of four-by-four pixel-blocks of the noisy video frame 211(n−1), one or more low-frequency coefficients, which are stored in the memory 204 as the low-frequency frame 212(n−1).

Figure 5:
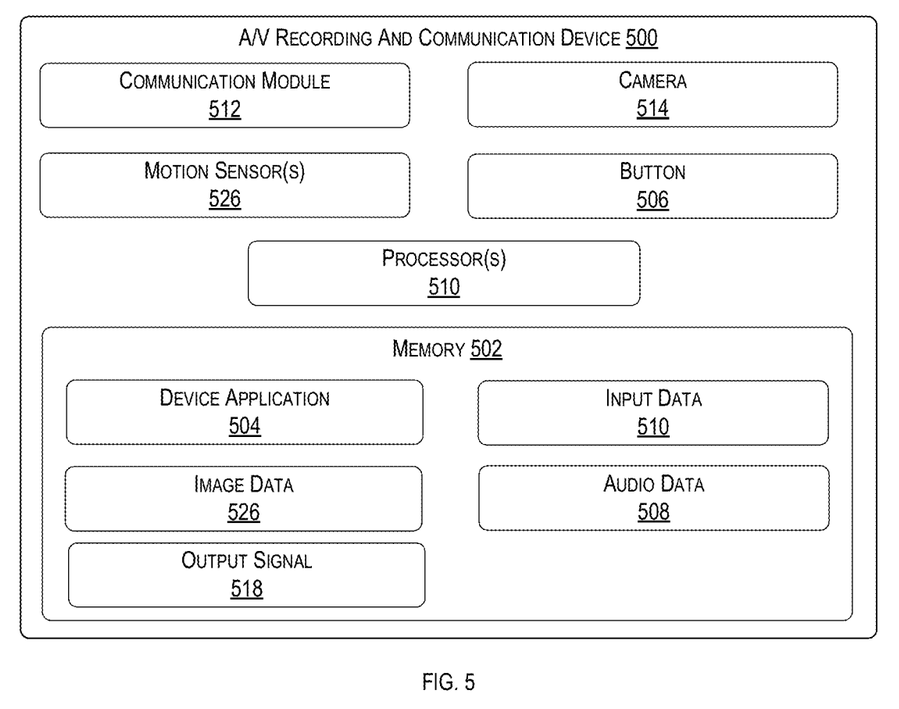
FIG. 5 is a functional block diagram illustrating one example embodiment of an A/V recording and communication device according to various aspects of the present disclosure.

FIG. 5 is another functional block diagram illustrating an embodiment of the A/V device 500 according to various aspects of the present disclosure. In some embodiments, the A/V device 500 may represent, and further include one or more of the components from, the video communication device 106, FIG. 1. Additionally, in some embodiments, the A/V device 500 may omit one or more of the components shown in FIG. 5 and/or may include one or more additional components not shown in FIG. 5.

As shown in FIG. 5, the A/V device 500 includes memory 502, which may represent the memory 204 and/or the memory 250, FIG. 2. The memory 502 stores a device application 504. In various embodiments, the device application 504 may configure the processor(s) 510 to capture image data 526 using the camera 514.

In addition, the device application 504 may configure the processor(s) 510 to transmit the image data 526 to a server 624 (FIG. 6) using the communication module 512. The server 624 may then transmit (or forward) the output signal 518 to the client device 120.

In further reference to FIG. 5, the image data 526 may comprise image sensor data such as (but not limited to) exposure values and data regarding pixel values for a particular sized grid. The image data 526 may include still images, live video, and/or pre-recorded images and/or video. The image data 526 may be recorded by the camera 514 in a field of view of the camera 514.

Figure 6:
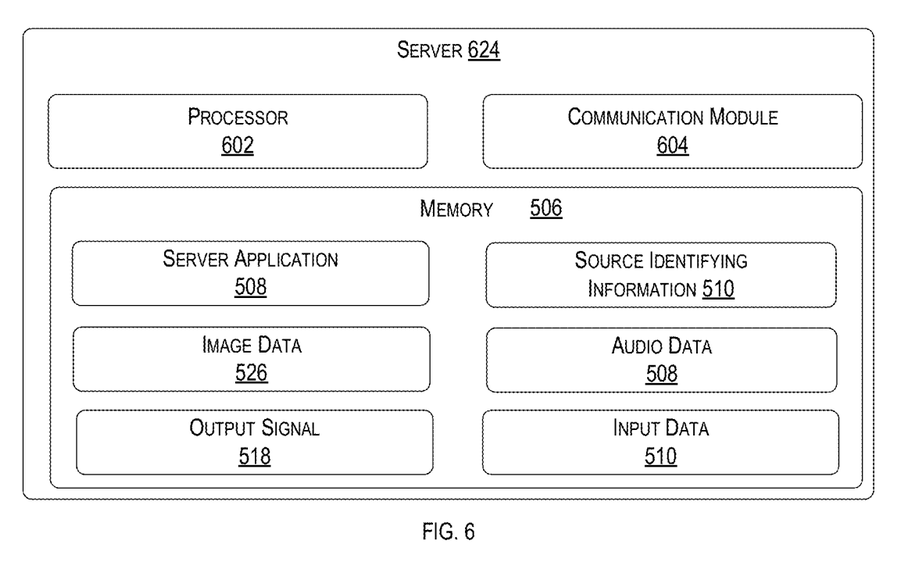
FIG. 6 is a functional block diagram illustrating one example embodiment of a backend device according to various aspects of the present disclosure.

FIG. 6 is a functional block diagram illustrating one embodiment of the server 624 according to various aspects of the present disclosure. The server 624 is an example of the server 115, and may comprise processor(s) 602, a communication module 604, and a memory 506. The communication module 604 may allow the server 624 to access and communicate with devices connected to a network (Internet/PSTN) (e.g., the A/V device 500, the client device 120).

The memory 502 may include a server application 508 that configures the processor(s) 602 to receive and/or retrieve the image data 526 from the A/V device 500. The server application 508 may also configure the processor(s) 602 to transmit (and/or forward) the image data 526 to the client device 120 using the communication module 604.

Figure 7:
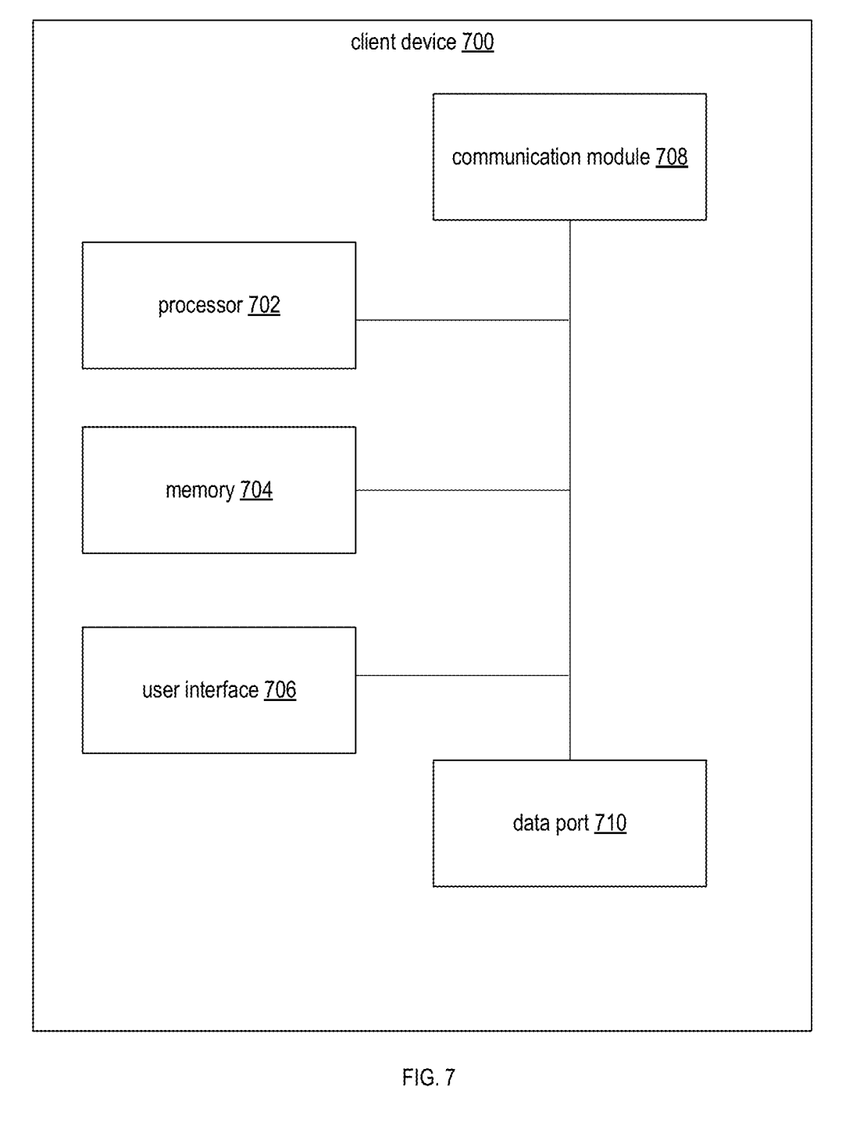
FIG. 7 is a functional block diagram of a client device on which the present embodiments may be implemented according to various aspects of the present disclosure.

FIG. 7 is a functional block diagram of a client device 700 on which the present embodiments may be implemented according to various aspects of the present disclosure. The user's client device 120 described with reference to FIG. 1 may include some or all of the components and/or functionality of the client device 700. The client device 700 may comprise, for example, one or more of a smartphone, a tablet computer, a laptop computer, and a desktop computer. The client device 700 includes a processor 702, a memory 704, a user interface 706, a communication module 708, and a dataport 710. These components are communicatively coupled together by an interconnect bus 712.

Features described and claimed herein may be combined in various ways without departing from the scope of the present embodiments. The following examples illustrate some possible, non-limiting combinations.

In an embodiment of a first aspect, a method for efficiently transmitting video captured by a video doorbell to a remotely-located smart display includes (i) controlling a camera of the video doorbell to capture a sequence of video frames including a first video frame and a second video frame subsequent thereto; (ii) producing a denoised video frame that is less noisy than the first video frame while retaining details of the first video frame; and (iii) transmitting the denoised video frame from the video doorbell to the remotely-located smart display. Producing the denoised video frame includes (a) filtering, at the video doorbell, one or more first high-frequency components from the first video frame to generate a first low-frequency frame that includes one or more first low-frequency components of the first video frame; and (b) generating a first filtered frame at the video doorbell. Generating the first filtered frame includes: (i) recursively filtering the first low-frequency frame to yield a first intermediate frame, (ii) compressing, with a first image-compression technique, the first intermediate frame to yield a first compressed frame, (iii) storing the first compressed frame in a memory of the video doorbell, and (iv) decompressing, with a first image-decompression technique, the first compressed frame to yield the first filtered frame.

In embodiments of the first aspect, producing the denoised video frame also includes (c) filtering, at the video doorbell, one or more second high-frequency components from the second video frame to generate a second low-frequency frame; and (d) generating a high-frequency frame.

In embodiments of the first aspect, generating a high-frequency frame includes (i) applying the first image-compression technique to the second low-frequency frame to yield a compact frame; (ii) applying the first image-decompression technique to the compact frame to yield a subtrahend frame; and (iii) subtracting, at the video doorbell, the subtrahend frame from the second video frame to yield the high-frequency frame.

In embodiments of the first aspect, producing the denoised video frame also includes (e) recursively filtering, at the video doorbell, the second low-frequency frame with the first filtered frame to yield a denoised low-frequency frame; and (f) combining the denoised low-frequency frame with the high-frequency frame to generate the denoised video frame.

In an embodiment of a second aspect, a method for denoising a video signal includes (i) generating a first low-frequency frame, including one or more first low-frequency components of a first video frame of the video, by filtering one or more first high-frequency components from the first video frame; and (ii) generating a first filtered frame by recursively filtering the first low-frequency frame with a previous video frame of the video that precedes the first video frame.

In embodiments of the second aspect, the method also includes (iii) generating a second low-frequency frame from a second video frame of the video subsequent to the first video frame, by filtering one or more second high-frequency components from the second video frame; (iv) generating a high-frequency frame from the second video frame and the second low-frequency frame; (v) recursively filtering the second low-frequency frame with the first filtered frame to yield a denoised low-frequency frame; and (vi) generating a denoised video frame by combining the denoised low-frequency frame with the high-frequency frame.

In embodiments of the second aspect, generating the high-frequency frame includes subtracting the second low-frequency frame from the second video frame.

In embodiments of the second aspect, recursively filtering includes applying an infinite impulse-response filter.

In embodiments of the second aspect, generating the first filtered frame includes: recursively filtering the first low-frequency frame to yield a first intermediate frame; compressing the first intermediate frame to yield a first compressed frame; and decompressing the first compressed frame to yield the first filtered frame.

In embodiments of the second aspect, compressing the first intermediate frame includes applying a first image-compression technique to the first intermediate frame and decompressing the first compressed frame includes applying a first image-decompression technique to the first compressed frame. In such embodiments, generating the high-frequency frame further may include: applying the first image-compression technique to the second low-frequency frame to yield a compact frame; applying the first image-decompression technique to the compact frame to yield a subtrahend frame; and subtracting the subtrahend frame from the second video frame.

In embodiments of the second aspect, compressing the first intermediate frame includes at least one of (i) applying a frequency quantization technique to the first filtered frame and (ii) encoding the first filtered frame with an entropy encoding scheme.

In embodiments of the second aspect, generating the first low-frequency frame includes: dividing the first video frame into a plurality of pixel-blocks; and for each pixel-block of the plurality of pixel-blocks: applying an integral transform to the pixel-block to yield a frequency-domain representation of the pixel-block; and extracting, from the frequency-domain representation of the pixel-block, one or more low-frequency coefficients corresponding to one or more frequencies below a frequency threshold.

In embodiments of the second aspect, for each pixel-block of the plurality of pixel-blocks, applying an integral transform may include applying a discrete cosine transform to the pixel-block.

In embodiments of the second aspect, when the one or more low-frequency coefficients include a plurality of low-frequency coefficients, the method further includes applying a quantization matrix to the plurality of low-frequency coefficients.

In embodiments of the second aspect, recursively filtering the first low-frequency frame may include: applying a recursive filter to the first low-frequency frame and the previous video frame, wherein inputs to the recursive filter include one or more decompressed low-frequency coefficients corresponding to the previous video frame.

In embodiments of the second aspect, may further include (i) before generating the first low-frequency frame, chroma subsampling the first video frame from a first color space, based on one of an additive and a subtractive color model, to a luminance-chrominance color space; and (ii) before generating the second low-frequency frame, chroma subsampling the second video frame from the first color space to the luminance-chrominance color space.

In an embodiment of a third aspect, a video denoising system, includes a processor and a memory. The memory stores non-transitory computer-readable instructions that, when executed by the processor, control the processor to: (a) generate a first filtered frame by recursively filtering a first low-frequency frame that (i) includes one or more first low-frequency components of a first video frame of a video, and (ii) excludes one or more first high-frequency components of the first video frame; (b) generate, a high-frequency frame including one or more second high-frequency components of a second video frame of the video subsequent to the first video frame; (c) recursively-filter a second low-frequency frame with the first filtered frame to yield a denoised low-frequency frame, the second low-frequency frame (i) including one or more second low-frequency components of the second video frame, and (ii) excluding the one or more second high-frequency components; and (d) generate a denoised video frame by combining the denoised low-frequency frame with the high-frequency frame.

In embodiments of the third aspect, the memory may further store non-transitory computer-readable instructions that, when executed by the processor, control the processor to subtract the second low-frequency frame from the second video frame when generating the high-frequency frame.

In embodiments of the third aspect, recursively filtering the first low-frequency frame generates a first intermediate frame, and the memory may further store non-transitory computer-readable instructions that, when executed by the processor while generating the first filtered frame, control the processor to: compress the first intermediate frame to yield a first compressed frame; and decompress the first compressed frame to yield the first filtered frame.

In embodiments of the third aspect, the memory is a first memory, and also includes a second memory; wherein the first memory also stores non-transitory computer-readable instructions that, when executed by the processor, control the processor to store the first compressed frame in the second memory.

In embodiments of the third aspect, the memory further stores non-transitory computer-readable instructions that, when executed by the processor, control the processor to: apply a first image-compression technique to the first filtered frame when compressing the first filtered frame; apply a first image-decompression technique to the first compressed frame when decompressing the first compressed frame; and when generating the high-frequency frame: apply the first image-compression technique to the second low-frequency frame to yield a compact frame; applying the first image-decompression technique to the compact frame to yield a subtrahend frame; and generate the high-frequency frame from the second video frame and the subtrahend frame.

In embodiments of the third aspect, the memory further stores non-transitory computer-readable instructions that, when executed by the processor, control the processor to: generate the first low-frequency frame by filtering the one or more first high-frequency components from the first video frame; and generate the second low-frequency frame by filtering the one or more second high-frequency components from the second video frame.

The above described embodiments may be combined in any combination without departing from the scope of the present embodiments. Moreover, the above described embodiments may include other features discussed herein, such as those discussed above in the detailed description of the embodiments.

Changes may be made in above methods and systems without departing from the scope of the present embodiments. It should thus be noted that the matter contained in above description or shown in accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

A color model or color space is a mathematical representation for a color. For example, the RGB color space is based on a Cartesian coordinate system, and the HSI color space is based on a polar coordinate system. RGB (red-green-blue) is a color model used for displaying in which any color is formed through the appropriate mixture of red, green, and blue. CMY (cyan-magenta-yellow) is a color model used for displaying in which any color is formed through the appropriate mixture of cyan, magenta, and yellow.

YCbCr is a color space used for digital component video formats. Y is the luma component and the Cb and Cr components are color difference signals. 4:4:4 YCbCr means that for every Y sample, there is one sample each of Cb and Cr. 4:2:2 YCbCr means that for every two horizontal Y samples, there is one sample each of Cb and Cr. 4:1:1 YCbCr means that for every four horizontal Y samples, there is one sample each of Cb and Cr. 4:2:0 YCbCr means that for every block of 2×2 Y samples, there is one sample each of Cb and Cr. There are three variations of 4:2:0 YCbCr, with the difference being the position of Cb and Cr sampling relative to Y.

YUV is the color space used by the NTSC and PAL video systems. The Y is the luma component, while the U and V are the color difference components. Herein, YUV420 and YUV422 correspond to 4:2:0 YCbCr and 4:2:2 YCbCr, respectively, which are described above.

In an additive color system or model, primary colors are added in varying proportions to yield a full range of colors. Additive primary colors are colors that are combined in an additive mixture to yield a full range of colors. Red, green, and blue are usually used as the additive primary colors.

In a subtractive color system or model, primary colors are combined in a subtractive mixture to yield a full range of colors. Subtractive primary colors are colors that are combined in a subtractive mixture to yield a full range of colors. Cyan, magenta, and yellow are usually used as the subtractive primary colors.

CIELAB "CIE L*a*b* (CIELAB) is a color space specified by the International Commission on Illumination (French Commission internationale de l'eclairage). It describes all the colors visible to the human eye, and was created to serve as a device-independent model to be used as a reference.

Chroma subsampling is the practice of encoding images by implementing less resolution for chroma (color) information than for luma (brightness or intensity) information, taking advantage of the human visual system's lower acuity for color differences than for luminance. In general, subsampled means that a signal has been sampled at a lower rate than some other signal in the system. For example, in the 4:2:2 YCbCr color space, for every two luma (Y) samples, only one Cb and Cr sample is present, meaning that the Cb and Cr signals are subsampled.

Compression includes the encoding of data or information (e.g., a video signal) so that it occupies less space and/or bandwidth. Entropy encoding is a coding scheme that involves assigning codes to symbols so as to match code lengths with the probabilities of the symbols. Typically, entropy encoders are used to compress data by replacing symbols represented by equal-length codes with symbols represented by codes proportional to the negative logarithm of the probability. Therefore, the most common symbols use the shortest codes. Quantization is a lossy compression technique achieved by compressing a range of values to a single quantum value. Lossy compression, or irreversible compression, is the class of data encoding methods that uses inexact approximations and partial data discarding to represent the content. These techniques are used to reduce data size for storing, handling, and transmitting content.

Interframe coding is video compression in which temporal redundancy is factored in. This form of compression takes advantage of the similarities between successive frames, so only the differences between them are coded, providing for higher compression ratios. Intraframe coding is video compression in which temporal redundancy is not factored in. This form of compression does not take advantage of any similarities between successive frames, resulting in lower compression ratios. However, individual frames can be better accessed and manipulated.

A filter is a signal processing operation that selectively amplifies or diminishes frequency components of a signal in one or more frequency intervals, the signal being a sequence or array of numbers stored in a data storage medium. Herein, "applying" a filter to a video frame means filtering the frame with the filter. For example, applying a low-pass filter to a frame means filtering the frame with a low-pass filter. In the spatial domain, this filtering may include convolving the video frame with a spatial-domain representation of the filter. In the frequency domain, this filtering may include multiplying the video frame by a frequency-domain representation of the filter. An example of a filter is an infinite-impulse response filter (IIR filter), which is a filter whose output is a weighed sum of the current inputs and past outputs, thus incorporating feedback.

A recursive filter is a type of filter that re-uses one or more of its outputs as an input. This feedback typically results in an infinite impulse response characterized by one of exponentially growing, decaying, or sinusoidal signal output components.

Noise is an unwanted electrical disturbance, often random and/or persistent in nature, that affects the quality or usefulness of a signal, or that adversely affects the operation of a device. Example types of noise include:

Fixed pattern noise—Noise in an image arising from variations in pixel responsivity in the absence of illumination. Sources of such variations include pixel size, MOSFETS in individual pixels and/or column circuits, and repeating irregularities in array clocking.

Read noise—Noise created within the camera electronics during the readout process as the electrons are subjected to the analog to digital conversion, amplification, and processing steps that enable an image to be produced.

Shot noise—1. A random form of noise arising from the discrete nature of electrons. Such noise may occur, for instance, as electrons randomly overcome a given potential barrier. 2. Noise observed in junction devices, such as p-n diodes or bipolar junction transistors.

The frequency domain is the representation of a signal as a function of frequency, as opposed to time. This contrasts with time [or spatial] domain, where the converse is true. A Fourier transform may be used to convert from the frequency domain to the time [or spatial] domain, and vice versa.

An object- or image-plane irradiance distribution is composed of "spatial frequencies" in the same way that a time-domain electrical signal is composed of various frequencies: by means of a Fourier analysis. A given profile across an irradiance distribution (object or image) is composed of constituent spatial frequencies. By taking a one-dimensional profile across a two-dimensional irradiance distribution, an irradiance-vs-position waveform is obtain, which can be Fourier decomposed in exactly the same manner as if the waveform was in the more familiar form of volts vs. time. A Fourier decomposition shows what frequencies are contained in the waveform in terms of spatial frequencies with units of cycles (cy) per unit distance, analogous to temporal frequencies in cy/s for a time-domain waveform. Unless otherwise specified, a frequency referred to herein is a spatial frequency.

What is claimed is:

1. A method for efficiently transmitting video captured by a video doorbell to a network device, the method comprising:
  controlling a camera of the video doorbell to capture a sequence of video frames including a first video frame and a second video frame subsequent thereto;
  producing a denoised video frame that is less noisy than the first video frame while retaining details of the first video frame by:
    filtering, at the video doorbell, one or more first high-frequency components from the first video frame to generate a first low-frequency frame that includes one or more first low-frequency components of the first video frame;
    generating a first filtered frame at the video doorbell by (i) recursively filtering the first low-frequency frame to yield a first intermediate frame, (ii) compressing, with a first image-compression technique, the first intermediate frame to yield a first compressed frame, (iii) storing the first compressed frame in a memory of the video doorbell, and (iv) decompressing, with a first image-decompression technique, the first compressed frame to yield the first filtered frame;
    filtering, at the video doorbell, one or more second high-frequency components from the second video frame to generate a second low-frequency frame that includes one or more second low-frequency components of the second video frame;

generating a high-frequency frame by (i) applying the first image-compression technique to the second low-frequency frame to yield a compact frame; (ii) applying the first image-decompression technique to the compact frame to yield a subtrahend frame; and (iii) subtracting, at the video doorbell, the subtrahend frame from the second video frame to yield the high-frequency frame;

recursively filtering, at the video doorbell, the second low-frequency frame with the first filtered frame to yield a denoised low-frequency frame; and combining the denoised low-frequency frame with the high-frequency frame to generate the denoised video frame; and transmitting the denoised video frame from the video doorbell to the network device.

2. A method comprising:

generating a first low-frequency frame, including one or more first low-frequency components of a first video frame of a video, by filtering one or more first high-frequency components from the first video frame;

generating a first filtered frame by recursively filtering the first low-frequency frame with a previous video frame of the video that precedes the first video frame;

generating a second low-frequency frame from a second video frame of the video subsequent to the first video frame, by filtering one or more second high-frequency components from the second video frame;

generating a high-frequency frame from the second video frame and the second low-frequency frame;

recursively filtering the second low-frequency frame with the first filtered frame to yield a denoised low-frequency frame; and generating a denoised video frame by combining the denoised low-frequency frame with the high-frequency frame.

3. The method of claim 2, wherein generating the high-frequency frame comprises subtracting the second low-frequency frame from the second video frame.

4. The method of claim 2, wherein recursively filtering comprises applying an infinite impulse-response filter.

5. The method of claim 2, generating the first filtered frame comprising:

recursively filtering the first low-frequency frame to yield a first intermediate frame;

compressing the first intermediate frame to yield a first compressed frame; and decompressing the first compressed frame to yield the first filtered frame.

6. The method of claim 5, compressing the first intermediate frame comprising applying a first image-compression technique to the first intermediate frame;

decompressing the first compressed frame comprising applying a first image-decompression technique to the first compressed frame; and generating the high-frequency frame further including:

applying the first image-compression technique to the second low-frequency frame to yield a compact frame;

applying the first image-decompression technique to the compact frame to yield a subtrahend frame; and subtracting the subtrahend frame from the second video frame.

7. The method of claim 5, compressing the first intermediate frame comprising at least one of (i) applying a frequency quantization technique to the first filtered frame and (ii) encoding the first filtered frame with an entropy encoding scheme.

8. The method of claim 2, wherein generating the first low-frequency frame comprises:

dividing the first video frame into a plurality of pixel-blocks; and for each pixel-block of the plurality of pixel-blocks:

applying an integral transform to the pixel-block to yield a frequency-domain representation of the pixel-block; and extracting, from the frequency-domain representation of the pixel-block, one or more low-frequency coefficients corresponding to one or more frequencies below a frequency threshold.

9. The method of claim 8, for each pixel-block of the plurality of pixel-blocks, applying an integral transform comprising applying a discrete cosine transform to the pixel-block.

10. The method of claim 9, wherein the one or more low-frequency coefficients includes a plurality of low-frequency coefficients, and the method further comprising applying a quantization matrix to the plurality of low-frequency coefficients.

11. The method of claim 2, wherein recursively filtering the first low-frequency frame with the previous video frame comprises:

applying a recursive filter to the first low-frequency frame and the previous video frame, wherein inputs to the recursive filter include one or more decompressed low-frequency coefficients corresponding to the previous video frame.

12. The method of claim 2, further comprising:

before generating the first low-frequency frame, chroma subsampling the first video frame from a first color space that is based on one of an additive and a subtractive color model, to a luminance-chrominance color space; and before generating the second low-frequency frame, chroma subsampling the second video frame from the first color space to the luminance-chrominance color space.

13. The method of claim 2, wherein generating the second low-frequency frame comprises filtering the one or more second high-frequency components from a first instance of the second video frame, and generating the high-frequency frame comprises subtracting the second low-frequency frame from a second instance of the second video frame.

14. A system, comprising:

at least one processor; and a memory storing non-transitory computer-readable instructions that, when executed by the at least one processor, control the at least one processor to:

generate a first filtered frame by recursively filtering a first low-frequency frame that (i) includes one or more first low-frequency components of a first video frame of a video, and (ii) excludes one or more first high-frequency components of the first video frame;

generate a high-frequency frame including one or more second high-frequency components of a second video frame of the video subsequent to the first video frame;

recursively-filter a second low-frequency frame with the first filtered frame to yield a denoised low-frequency frame, the second low-frequency frame (i) including one or more second low-frequency components of the second video frame, and (ii) excluding the one or more second high-frequency components; and generate a denoised video frame by combining the denoised low-frequency frame with the high-frequency frame.

15. The video denoising system of claim 14, the memory further storing non-transitory computer-readable instructions that, when executed by the at least one processor, control the at least one processor to:

subtract the second low-frequency frame from the second video frame when generating the high-frequency frame.

16. The video denoising system of claim 14, wherein recursively filtering the first low-frequency frame generates a first intermediate frame, the memory further storing non-transitory computer-readable instructions that, when executed by the at least one processor while generating the first filtered frame, control the at least one processor to:

compress the first intermediate frame to yield a first compressed frame; and decompress the first compressed frame to yield the first filtered frame.

17. The video denoising system of claim 16, the memory being a first memory, and further comprising:

a second memory, the first memory further storing non-transitory computer-readable instructions that, when executed by the at least one processor, control the at least one processor to store the first compressed frame in the second memory.

18. The video denoising system of claim 16, the memory further storing non-transitory computer-readable instructions that, when executed by the at least one processor, control the at least one processor to:

apply a first image-compression technique to the first filtered frame when compressing the first filtered frame;

apply a first image-decompression technique to the first compressed frame when decompressing the first compressed frame; and when generating the high-frequency frame:

apply the first image-compression technique to the second low-frequency frame to yield a compact frame;

applying the first image-decompression technique to the compact frame to yield a subtrahend frame; and generate the high-frequency frame from the second video frame and the subtrahend frame.

19. The video denoising system of claim 14, the memory further storing non-transitory computer-readable instructions that, when executed by the at least one processor, control the at least one processor to:

generate the first low-frequency frame by filtering the one or more first high-frequency components from the first video frame; and generate the second low-frequency frame by filtering the one or more second high-frequency components from the second video frame.

20. The video denoising system of claim 19, the memory further storing non-transitory computer-readable instructions that, when executed by the at least one processor, control the at least one processor to generate the first low-frequency frame by:

dividing the first video frame into a plurality of pixel-blocks; and for each pixel-block of the plurality of pixel-blocks:

applying an integral transform to the pixel-block to yield a frequency-domain representation of the pixel-block; and extracting, from the frequency-domain representation of the pixel-block, one or more low-frequency coefficients.

* * * * *